United States Patent
Fuma et al.

(10) Patent No.: US 6,438,841 B1
(45) Date of Patent: Aug. 27, 2002

(54) DEVICE FOR HOLDING FIXING ROLLER, METHOD FOR MANUFACTURING FIXING ROLLER, AND IMAGE FORMING APPARATUS

(75) Inventors: Hiroshi Fuma; Shuta Hamada; Masahiro Onodera, all of Tokyo (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/702,323

(22) Filed: Oct. 31, 2000

(30) Foreign Application Priority Data

Nov. 1, 1999 (JP) .......................... 11-310924
Mar. 23, 2000 (JP) ....................... 2000-082006

(51) Int. Cl.⁷ ................. B25F 05/02; F16C 13/00
(52) U.S. Cl. ................. 29/895.32; 29/895.21; 29/895.3; 29/527.1; 29/527.2; 29/527.3; 29/406; 264/269; 264/279; 264/279.1; 492/56
(58) Field of Search ................. 29/895.32, 895.2, 29/895.21, 527.1, 527.2, 527.3, 406; 492/47, 56, 59; 264/269, 279, 279.1

(56) References Cited

U.S. PATENT DOCUMENTS

| | | | | |
|---|---|---|---|---|
| 2,845,657 A | * | 4/1958 | Beare | |
| 2,864,130 A | * | 12/1958 | Beare | |
| 3,380,120 A | * | 4/1968 | Rowland et al | |
| 3,607,494 A | * | 9/1971 | Rowland | |
| 3,613,168 A | * | 10/1971 | Rowland et al | |
| 3,724,983 A | * | 4/1973 | Nelson | |
| 3,750,250 A | * | 8/1973 | Brown | |
| 5,089,201 A | * | 2/1992 | Takahashi | 29/895.32 |
| 5,753,165 A | * | 5/1998 | Watanabe et al | 29/895.32 |
| 6,136,447 A | * | 10/2000 | Nakamura et al | 29/895.32 |
| 6,168,751 B1 | * | 1/2001 | Delrosario et al | |

FOREIGN PATENT DOCUMENTS

| | | | | |
|---|---|---|---|---|
| JP | 59-049956 | * | 3/1984 | 264/279 |
| JP | 60-090722 | * | 5/1985 | 264/279 |
| JP | 63-008680 | * | 1/1988 | 264/279 |
| SU | 831-682 | * | 5/1981 | 492/47 |

* cited by examiner

Primary Examiner—I Cuda Rosenbaum
Assistant Examiner—Eric Compton
(74) Attorney, Agent, or Firm—Bierman, Muserlian and Lucas

(57) ABSTRACT

There is described a method for manufacturing fixing rollers and a roller body holding device utilized for manufacturing fixing rollers. The method includes steps of press-fitting flanges into a roller body, shaped in a hollow cylinder, from each of both end openings of the roller body with putting an elastic material between each of the flanges and the roller body; installing the roller body in a shaping mold so that the roller body is supported by the flanges and the elastic material at a predetermined position in the shaping mold; injecting a melted rubber into a space between the roller body and the shaping mold from an injection opening; and curing the melted rubber injected into the space. The roller body holding device for holding a roller body is shaped in a hollow cylinder and includes a flange, which is press-fitted into the roller body from each of end openings of the roller body; and an elastic material disposed between the flange and the roller body.

10 Claims, 8 Drawing Sheets

DEVICE FOR HOLDING FIXING ROLLER, METHOD FOR MANUFACTURING FIXING ROLLER, AND IMAGE FORMING APPARATUS

BACKGROUND OF THE INVENTION

The present invention relates to a fixing roller base body holding device utilized for manufacturing fixing rollers, which can be employed for image forming apparatus, such as copiers, printers, facsimile devices, etc., and a method for manufacturing fixing rollers and image forming apparatus.

The present applicant has proposed the image forming apparatus, comprising a fixing roller, which can be instantaneously heated up, or rapidly heated up in a short time, as set forth in Tokuganhei 10-28917.

In Tokuganhei 10-28917, there is disclosed a fixing roller, in which Pyrex glass, a ceramic material made of sapphire ($Al_2O_3$), $CaF_2$, etc. or a transparent resin material made of polyimide, polyamide, etc., is employed for the roller base body of the fixing roller, and a heat-rays absorbing layer, mingled with powders of carbon black, graphite, iron black ($Fe_3O_2$), or various kinds of ferrite materials, etc., is formed on the outer circumferential surface of the roller base body by baking or applying process, so that the heat-rays absorbing layer effectively absorbs such heat-rays irradiated from a halogen lump or a xenon lump disposed interior of the roller base body, and further, a fluorine resin (PFA) tube, covering the outer circumferential surface of the heat-rays absorbing layer, or a release layer, formed by applying a fluorine resin paint on it, is provided.

Further, as other structures of the fixing roller, there are also disclosed embodiments, in which a heat-rays transmittable rubber layer made of silicon rubber, mingled with powders of metal oxide materials, such as silica, alumina, magnesium oxide, etc., is formed on the outer circumferential surface of the roller base body, and further, an integral heat-rays absorbing layer, integrated with a heat-rays absorbing layer and a release layer, is formed by compounding a heat-rays absorbing material mingled with powders of carbon black, graphite, iron black, or various kinds of ferrite materials and its compounds, capper oxide, cobalt oxide, red oxide, etc., and a fluorine resin paint, working as both binder and release member.

The fixing roller, disclosed in the above, is very useful, since the surface temperature of it can reach to an allowable temperature for its fixing operation within a very short time.

Conventionally, however, there has been no concrete proposal for a configuration to form a kind of layer, such as a heat-rays absorbing layer, etc., on the outer circumferential surface of the roller base body.

As an example, a method of forming a layer, in which a pipe, serving as a roller base body, is disposed at a predetermined position in an interior of a casting mold, and, for instance, a melted rubber is poured into the casting mold to be cured between the pipe and the casting mold, may be applicable.

The present applicant performed an experiment in such a configuration that the roller base body is integrated with a mold by supporting the roller base body interior of the mold by means of flanges, and a part of the flange is inserted into each of both end openings of the roller base body to position the roller base body at a predetermined position in the mold.

As a result of the experiment, the present applicant has found a problem that, especially when a cylindrical glass hereinafter, also referred to as a glass pipe) is employed for the roller base body, damages of the both end portions of the glass pipe occur.

Concretely speaking, although it is desirable that the flanges are made of a metal material, such as iron, etc., from the handling point of view, when the flanges are heated up by the high temperature melted rubber injected into the mold, the flanges push the glass pipe expanding, due to the difference of thermal expansion between glass and metal, resulting in the abovementioned damages.

To overcome the abovementioned problem, it may be possible to introduce an allowance between them. Such the allowance, however, make it impossible to precisely adjust the center axes of both the glass pipe and the mold at the same position, resulting in an uneven thickness of the layer formed on the glass pipe.

Further, when the fixing roller, which employs the glass pipe for the roller base body, is mounted onto a frame of the fixing device with a normal bearing, it has been difficult to obtain a sufficient accuracy.

In other words, since the glass pipe is low in the accuracy and has variations in the dimension, an appropriate bearing, having a larger inner diameter, may be employed for supporting the glass pipe. In such structure, however, the excessive allowance between the glass pipe and the bearing makes it difficult to adjust the pressing roller, which rotates while pressing the fixing roller, in parallel with the fixing roller, and as a result, causes fixing defects.

SUMMARY OF THE INVENTION

To overcome the abovementioned drawbacks in conventional roller body holding devices, it is a main object of the present invention to provide a roller body holding device, which makes it possible to effectively hold a roller body in a simple structure. Incidentally, a term of "rubber", described in the present specification, indicates a "synthetic elastomer".

Accordingly, to overcome the cited shortcomings, the abovementioned object of the present invention can be attained by methods for manufacturing a fixing roller and roller body holding devices described as follow.

(1) A method for manufacturing a fixing roller, comprising steps of: press-fitting flanges into a roller body, shaped in a hollow cylinder, from each of both end openings of the roller body with putting an elastic material between each of the flanges and the roller body; installing a roller body holding device, which includes the flanges press-fitted into the roller body, at a predetermined position in a shaping mold; injecting a melted rubber into a space between the roller body and the shaping mold from an injection opening; and curing the melted rubber injected into the space.

(2) The method of item 1, wherein the roller body is made of glass, and the melted rubber contains a heat absorbing material.

(3) The method of item 1, wherein a heat-resistant tube is provided on an inner circumferential surface of the shaping mold, and integrated with the roller body by curing the melted rubber.

(4) The method of item 1, wherein the elastic material is provided on outer circumferential surfaces of the flanges, so as to shape a ring.

(5) The method of item 1, wherein the flanges are fitted into a shaft, which is inserted into an interior of the roller body.

(6) The method of item 1, wherein the elastic material is shaped in a ring, and equipped in a groove, which is formed in a circumferential direction on outer surfaces of the flanges.

(7) The method of item 1, wherein a plurality of the elastic materials are equipped on circumferential surfaces of the flanges, spacing each other with appropriate distances.

(8) The method of item 1, wherein the elastic material is detachable with respect to the flanges.

(9) The method of item 1, wherein the elastic material is made of either a silicon rubber or a fluorine rubber.

(10) The method of item 1, wherein the roller body, shaped in the hollow cylinder, is made of glass.

(11) A method for manufacturing a fixing roller, comprising steps of: installing a roller body, shaped in a hollow cylinder, at a predetermined position in a shaping mold by pushing both ends of the roller body by means of holding members, which are movable in an center axis direction of the roller body; injecting a melted rubber into a space between the roller body and the shaping mold from an injection opening; and curing the melted rubber injected into the space.

(12) The method of item 11, wherein each of the holding members comprises a cone-shaped surface, which contacts each of both end edges of the inner circumferential surface of the roller body.

(13) The method of item 12, wherein each of the holding members is urged in the center axis direction of the roller body by an urging member, so that the cone-shaped surface pushes each of both end edges of the inner circumferential surface of the roller body to hold the roller body.

(14) An image forming apparatus, comprising: a roller-type fixing device, in which a bearing is fitted on an outer circumferential surface of a fixing roller, manufactured by the method cited in item 1 or item 11, to support the fixing roller.

(15) A roller body holding device for holding a roller body, shaped in a hollow cylinder, comprising: a flange, each of which is press-fitted into the roller body from each of end openings of the roller body; and an elastic material disposed between the flange and the roller body.

(16) The roller body holding device of item 15, wherein the elastic material is provided on an outer circumferential surface of the flange, so as to shape a ring.

(17) The roller body holding device of item 15, wherein the flange is fitted into a shaft, which is inserted into an interior of the roller body.

(18) The roller body holding device of item 15, wherein the elastic material is shaped in a ring, and equipped in a groove, which is formed in a circumferential direction on an outer surface of the flange.

(19) The roller body holding device of item 15, wherein a plurality of the elastic materials are equipped on a circumferential surface of the flange, spacing each other with appropriate distances.

(20) The roller body holding device of item 15, wherein the elastic material is detachable with respect to the flange.

(21) The roller body holding device of item 15, wherein the elastic material is made of either a silicon rubber or a fluorine rubber.

(22) The roller body holding device of item 15, wherein the roller body, shaped in a hollow cylinder, is made of glass.

(23) A roller body holding device for holding a roller body, shaped in a hollow cylinder, comprising: a holding member, which is movable in an center axis direction of the roller body and disposed at each of both ends of the roller body, to push both ends of the roller body to hold the roller body; a fixed mold, disposed at one end of the roller body, to movably accommodate the holding member; and a movable mold, disposed at another end of the roller body, to movably accommodate the-holding member.

(24) The roller body holding device of item 23, wherein the holding member comprises a cone-shaped surface, which contacts each of both end edges of the inner circumferential surface of the roller body.

(25) The roller body holding device of item 23, wherein the holding member is urged in the center axis direction of the roller body by an urging member, so that the cone-shaped surface pushes each of both end edges of the inner circumferential surface of the roller body to hold the roller body.

(26) A roller body holding device for holding a roller body, shaped in a hollow cylinder, comprising: a flange, which is press-fitted onto an outer surface of the roller body at each of end portions of the roller body; and an elastic material disposed between the flange and the roller body.

(27) The roller body holding device of item 26, wherein the elastic material is provided on an inner circumferential surface of the flange, so as to shape a ring.

(28) The roller body holding device of item 26, wherein the flange is fitted into a shaft, which is inserted into an interior of the roller body.

(29) The roller body holding device of item 26, wherein the elastic material is shaped in a ring, and equipped in a groove, which is formed in a circumferential direction on an inner surface of the flange.

(30) The roller body holding device of item 26, wherein a plurality of the elastic materials are equipped on a circumferential surface of the flange, spacing each other with appropriate distances.

(31) The roller body holding device of item 26, wherein the elastic material is detachable with respect to the flange.

(32) The roller body holding device of item 26, wherein the elastic material is made of either a silicon rubber or a fluorine rubber.

BRIEF DESCRIPTION OF THE DRAWINGS

Other objects and advantages of the present invention will become apparent upon reading the following detailed description and upon reference to the drawings in which:

FIG. 7(a) shows a cross sectional view of a transmittable base body, both end portions of which are supported by holding members, while FIG. 7(b) shows a cross sectional view of the transmittable base body, illustrating a state before holding members are fitted into both end portions of the transmittable base body;

FIG. 9(a) shows a cross-sectional view of the fixing roller and the shaping mold for manufacturing the fixing roller, as a forth embodiment of the roller body holding device embodied in the present invention, while FIG. 9(b) shows a cross sectional view of the transmittable base body, illustrating a state before holding members are attached to both end portions of the transmittable base body.

DETAILED DESCRIPTION OF THE PREFERRED EMBODIMENT

Referring to drawings, an example of image forming apparatus, embodied in the present invention, will be detailed in the following.

Figure 1:
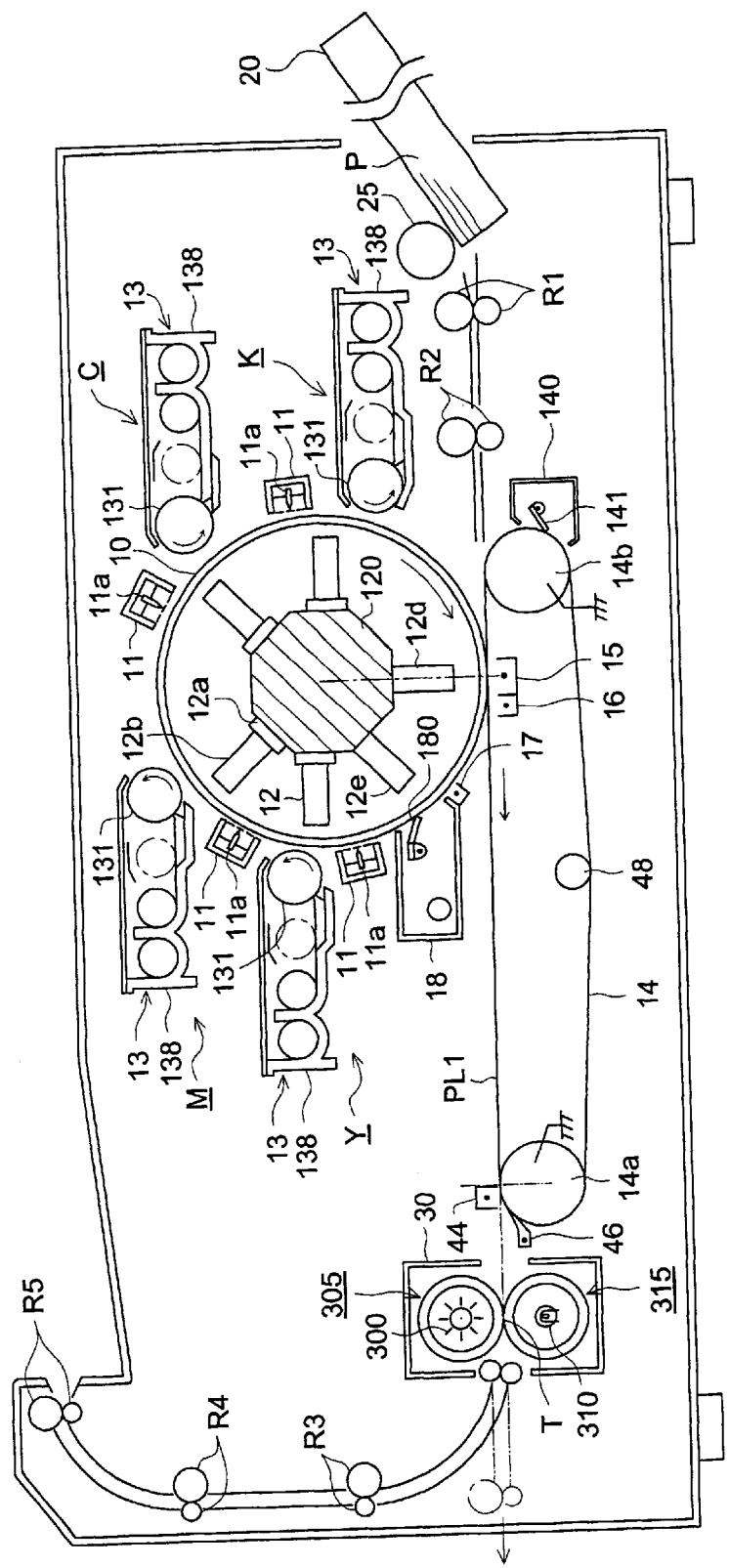
FIG. 1 shows a simplified structural view of an image forming apparatus for a color printer.

FIG. 1 shows a simplified structural view of an image forming apparatus for a color printer.

In FIG. 1, numeral 10 is a photoreceptor drum serving as an image forming member; numeral 11 is a scorotron charger serving as a charging means for each color; numeral 12 is an exposure optical system serving as an image writing means for each color; numeral 13 is a developing device serving as a developing means for each color; and numeral 14 is a transfer belt.

Photoreceptor drum 10 serving as the image bearing member has such a structure that, for example, a photoreceptor layer (also called photo-conductive layer) such as a transparent conductive layer, a-Si layer or organic photoreceptor layer (OPC), is formed on the outer periphery of a cylindrical base body formed of a transparent member such as optical glass or transparent acrylic resin, and is rotated clockwise as shown by an arrow in FIG. 1, while the conductive layer is electrically grounded.

Scorotron charger 11 serving as a charging means for each color, exposure optical system 12 serving as an image writing means for each color, and developing device 13, serving as a developing means are combined into one set, and four sets of them are provided for an image forming process for each color of yellow (Y), magenta (M), cyan (C) and black (k), and arranged in the order of Y, M, C, and K in the rotational direction of photoreceptor drum 10 as shown by an arrow in FIG. 1.

Scorotron charger 11, serving as a charging means for each color, has a control grid respectively kept at predetermined potential voltage, and discharging electrode 11a formed of, for example, a saw-toothed electrode, and is provided opposing to the photoreceptor layer of photoreceptor drum 10, and conducts a charging operation by corona discharging with the same polarity as that of toner (in the present example, negative charging), and applies uniform potential voltage onto photoreceptor drum 10.

As for discharging electrode 11a, a wire electrode or a needle-shaped electrode may also be applicable.

Each of exposure optical systems 12 is arranged inside photoreceptor drum 10 in such a manner that the exposure position on photoreceptor drum 10 is located at the downstream side in the rotational direction of photoreceptor drum 10 with respect to above-described scorotron charger 11 for each color.

Each of exposure optical systems 12 is formed into an exposure unit structured by linear exposure element 12a, in which a plurality of LEDs (light emitting diode) as a light emitting element for image-wise exposure light (image writing light) are aligned array-like, wherein liner exposure element 12a is arranged in the primary scanning direction in parallel with a drum shaft; and light converging optical transmitter 12b (trade name: Selfoc lens array) serving as an image focusing element; and a lens holder (not shown in the drawings), and the exposure unit is mounted onto holding member 120.

Other than exposure optical system 12 for each color, transfer simultaneous exposure unit 12d and uniform exposure unit 12e are also mounted onto holding member 120, and integrally accommodated inside a light transmissive base body of photoreceptor drum 10.

Each of exposure optical systems 12 for each color imagewise-exposes the photoreceptor layer of photoreceptor drum 10 from the reverse surface, according to image data, for each color, read by an image reading apparatus separately provided and stored in a memory, and forms an electrostatic latent image on photoreceptor drum 10.

As exposure elements 12a, an exposure element in which a plurality of light emitting elements such as FLs fluorescent material emission elements), ELs (electro-luminescence elements), PLs (plasma discharge elements), etc., are aligned array-like, may be used other than LEDs.

The wavelength of light emission of the image-wise exposure light emitting element is used normally in the range of 780–900 nm within which the transparency of Y, M, C toners is high, however, in the present invention, because image-wise exposure is carried out from the rear surface of the photoreceptor drum, the shorter wavelength of 400–700 nm, which has insufficient transparency for color toners, may be allowable.

Each of developing devices 13, serving as a developing means for each color, has developing sleeve 131, formed of, for example, cylindrical non-magnetic stainless steel or aluminum material, and is respectively rotated in the same direction as photoreceptor drum 10 at the developing position, while keeping a predetermined gap with respect to the circumferential surface of photoreceptor drum 10, and has developing casing 138, in which one-component or two-component developers for yellow (Y), magenta (M), cyan (C), and black (K) are respectively accommodated.

Each of developing devices 13 has a predetermined gap with respect to photoreceptor drum 10 and is kept in non-contact with the photoreceptor drum 10. When developing bias voltage in which DC voltage and AC voltage are superimposed, is applied onto developing sleeve 131, non-contact reversal development is carried out and a toner image is formed on photoreceptor drum 10.

Numerals 14a and 14b are rollers for threading transfer belt 14 between them. Roller 14 is driven by the driving source (not shown in the drawings) to rotate transfer belt 14 in a direction designated by the arrow shown in FIG. 1.

Numerals 15 and 16 are a transfer device, serving as a first and a second transfer means, and a discharger, which are disposed opposite photoreceptor drum 10 with putting transfer belt 14 between them; numeral 17 is an AC discharger for discharging photoreceptor drum 10 after the transferring operation; and numeral 18 is a cleaning device, having cleaning blade 180, for cleaning the circumferential surface of photoreceptor drum 10 after the discharging operation.

Numeral 15 is a cassette for storing sheet P onto which a toner image formed on photoreceptor drum 10 will be transferred and numeral 25 is a sheet-feeding roller.

Conveyance paired rollers R1–R5, transfer belt 14, heat roller type fixing device 30 (hereinafter, referred to as fixing device 30, for simplicity), etc. are disposed in the conveyance path of sheet P.

Numeral 44 indicates a sheet separation AC discharger, which is disposed opposite roller 14a with putting transfer belt 14 between them.

Fixing device 30 incorporates halogen heater 300 (a halogen lump), first roller 305 (a first fixing roller), which can rotate around halogen heater 300 and second roller 315 (a second fixing roller), which can rotate while contacting first roller 305 with pressure. Symbol T indicates a nip portion.

The base body of first roller 305 is made of a transparent material. In the present embodiment, a glass cylinder, having a diameter of 28 mm and a thickness of 1.5 mm, is employed for the base body.

Incidentally, a transparent silicon rubber layer is formed on the outer surface of the base body. Further, a heat-resistant tube, made of PFA (Perfluoroalkoxy), which is improved in a light absorbing efficiency by mixing carbon black materials, etc., is covered over the outer surface of the transparent silicon rubber layer.

Second roller 315 comprises a suitable silicon rubber layer formed on the roller base body and incorporates a suitable heater 310 inside, being a halogen lump or a xenon lump, etc.

Incidentally, in FIG. 1, numeral 46 indicates a separating claw for strictly separating sheet P, which is conveyed while adhering to transfer belt 14 after transferring operation, from transfer belt 14. For this purpose, the leading edge of separating claw 46 is located near transfer belt 14 inscribed to roller 14a.

The image forming process performed in the abovementioned image forming apparatus will be detailed in the following.

When image recording is stated, photoreceptor drum 10 is rotated clockwise as shown by an arrow in FIG. 1 by the start of a photoreceptor driving motor (not shown in the drawings) and simultaneously, the scorotron charger 11 of yellow (Y) is activated to apply a predetermined potential voltage onto photoreceptor drum 10.

After the potential voltage is applied onto photoreceptor drum 10, image writing by an electric signal corresponding to the first color signal, namely, Y image data, is started by Y exposure optical system 12, and an electrostatic latent image corresponding to a Y image of the document image is formed on the surface of photoreceptor drum 10.

The latent image is reversal-developed under the non-contact condition by Y developing device 13, and a toner image of yellow (Y) is formed on photoreceptor drum 10.

Next, potential voltage is applied onto photoreceptor drum 10 from above the Y toner image by the charging action of magenta (M) scorotron charger 11, and image writing by an electric signal corresponding to the second color signal, namely, M image data, is conducted by M exposure optical system 12, and a toner image of magenta (M) is formed on the toner image of yellow (Y) by superimposition, by non-contact reversal development by M developing device 13.

In the same process, by cyan (C) scorotron charger 11, C exposure optical system 12 and C developing device 13, a toner image of cyan (C) corresponding to the third color signal is formed on the above toner images by superimposition, and further, by black (K) scorotron charger 11, K exposure optical system 12 and K developing device 13, a toner image of black (K) corresponding to the fourth color signal is successively superimposed and formed thereon, and thus, superimposed color toner images of four colors of yellow (Y), magenta (M), cyan (C) and black (K) are formed on the circumferential surface of photoreceptor drum 10 during its one rotation.

The image writing onto the photoreceptor layer of photoreceptor drum 10 by exposure optical systems 12 of Y, M, C and K is conducted from the inside of the drum through the above-described light transmissive base body.

Accordingly, the image writing corresponding to the second, third and fourth color signals is conducted without any influence due to previously formed toner images, and the electrostatic latent image with the same quality as that of the image corresponding to the first color signal can be formed.

The superimposed color toner image, formed on photoreceptor drum 10, serving as a image forming member, through the abovementioned image forming process, is collectively transferred onto sheet P by transfer device 15 in the transfer area.

Toner, remaining on the circumferential surface of photoreceptor drum 10 after the transferring operation, is discharged by photoreceptor drum AC discharger 17, and then, is cleaned by means of cleaning device 18. Thus, the circumferential surface of photoreceptor drum 10 is provided for the next image forming process.

In this embodiment, the hysteresis of the previous image formation remained on the surface of photoreceptor drum 10 is erased by activating uniform exposure device 12e, which employs, for example, light emitting diodes, after the cleaning operation and proceeding to the next charging operation.

Recording sheet P, on which a color toner image is formed, is separated from transfer belt 14 by the discharging operation of AC discharger 44 and by separation claw 210, and then, conveyed to fixing apparatus 17, in which the toner image is fixed on sheet P.

The obverse and reverse sides of recording sheet P on which two-sided images are recorded, are reversed, and the recording sheet P is sent and delivered onto a tray outside the apparatus through conveyance rollers R3, R4, R5.

Incidentally, although the color image forming apparatus, equipped with the fixing device which includes the fixing roller (the first fixing roller or the first roller mentioned above) embodied in the present invention, has been explained as an embodiment of image forming apparatus in the above, the scope of the present invention is not limited to the color image forming apparatus. The present invention can be also applied for monochrome image forming apparatus.

Figure 2:
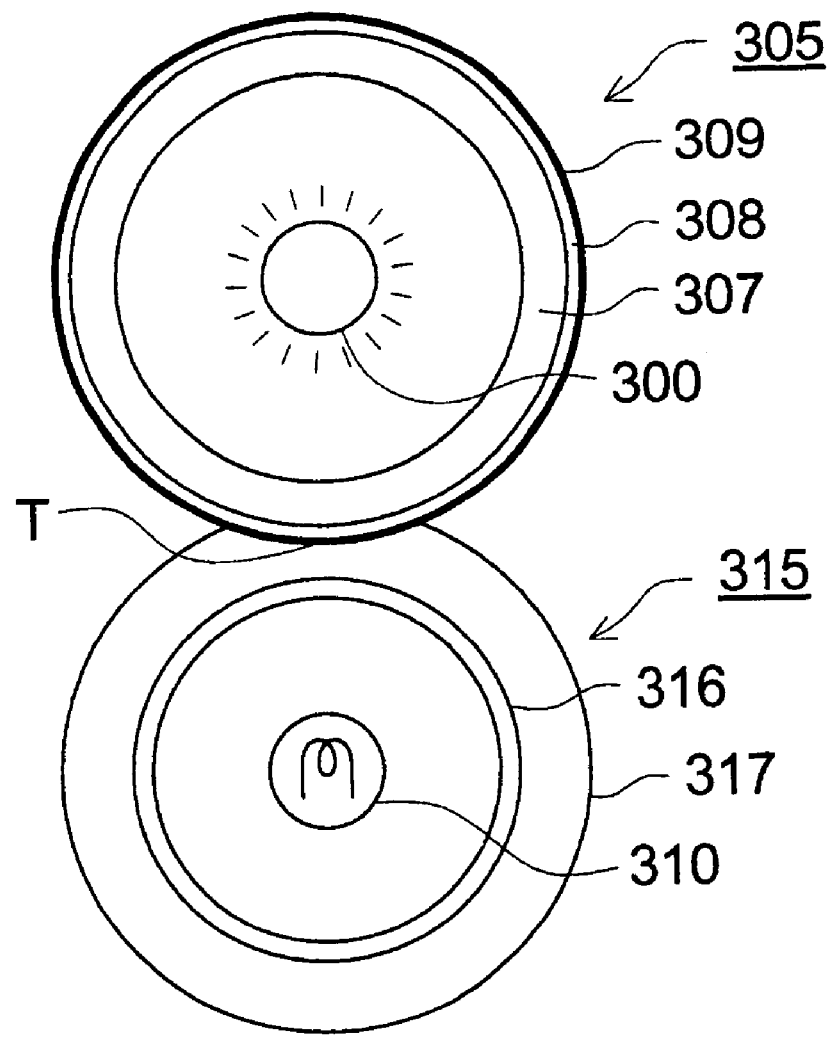
FIG. 2 shows an illustrative cross-sectional view of the first roller and the second roller, which are main elements in the heat-roller-type fixing device, for explaining a structure of them.

FIG. 2 shows an illustrative cross-sectional view of first roller 305 and second roller 315, which are main elements in heat-roller-type fixing device 30, for explaining a structure of them.

In FIG. 2, the same members as the aforementioned members are indicated with the same notational symbols.

In FIG. 2, first roller 305, embodied in the present invention, is disposed at such a position that a non-fixed toner image, transferred onto sheet P, contacts the circumferential surface of first roller 305.

First roller 305 and second roller 315 tightly contact each other with a predetermined pressing force to form nip portion T between them. At the time of fixing operation, first roller 305 rotates in a reverse direction of second roller 315 while maintaining a state of pressing contact, to fuse and fix the non-fixed toner image onto sheet P by applying heat and pressure at nip portion T.

First roller 305 is comprised of roller body 307 made of a cylindrical glass material, transparent silicon rubber layer 308 formed on the outer circumferential surface of roller body 307 and release layer 309 made of PFA tube, which further covers over the outer circumferential surface of transparent silicon rubber layer 308.

Second roller 315 is comprised of, for instance, cylindrical metallic pipe 316 made of aluminum and silicon rubber layer 317 covered on the outer circumferential surface of cylindrical metallic pipe 316. Heater 310 is disposed inside cylindrical metallic pipe 316 to form second roller 315 as a soft roller.

Other than the glass materials, which are defined as inorganic substances obtained through cooling solidification process without separating any crystals, Pyrex glass, ceramic materials made of sapphire ($Al_2O_3$), $CaF_2$, etc. or transparent resin materials made of polyimide, polyamide, etc., through which a light emitted from a light-emitting member, such as halogen heater 300 (a halogen lump), etc., can penetrate, can be employed for roller body 307, serving as a transparent base body, which constitutes first roller 305. Further, a fluorine resin (PFA) tube, serving as a heat-absorbing layer, in which powders of carbon black, graphite, iron black ($Fe_3O_2$), or various kinds of ferrite materials, etc., are mixed, so as to effectively absorb heat rays irradiated from such the halogen lump or the xenon lump disposed inside first roller 305, can be provided on the outer circumferential surface of transparent silicon rubber layer 308.

As another structure of the fixing roller, on the outer circumferential surface of such the roller body, it is also possible to form an integral heat-rays absorbing layer, integrated with a heat-rays transmittable rubber layer made of silicon rubber in which powders of metal oxide materials, such as silica, alumina, magnesium oxide, etc. are mixed as a filler, a heat-rays absorbing layer in which powders of carbon black, graphite, iron black, or various kinds of ferrite materials and its compounds, capper oxide, cobalt oxide, red oxide, etc., are mixed, and a release layer into which a fluorine resin paint, working as both binder and release member, is compounded. As mentioned above, the structural design versatility of the fixing roller is over a wide range.

Figure 3:
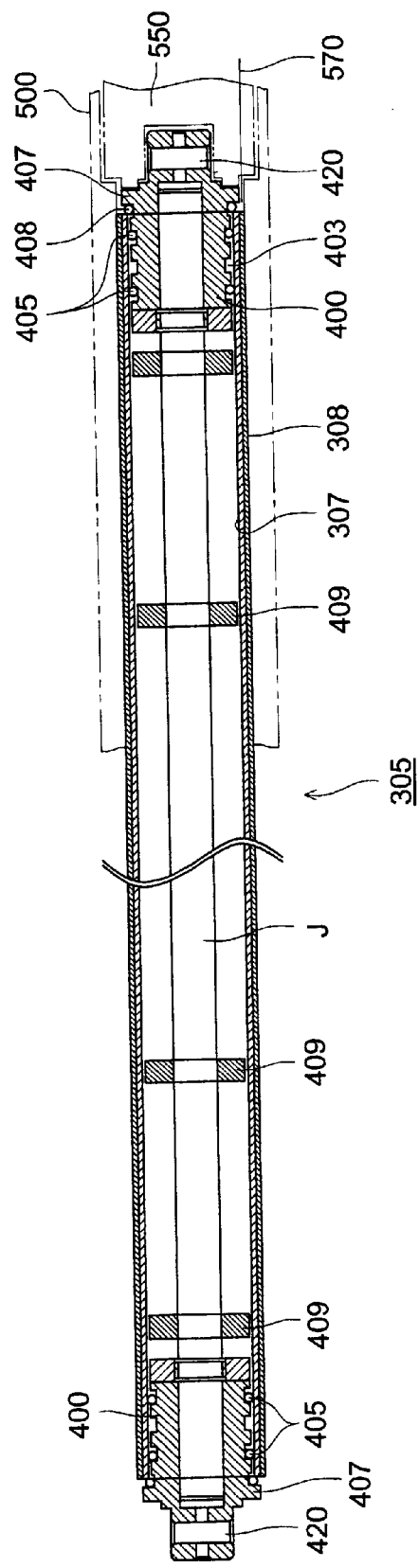
FIG. 3 shows an illustrative view of a roller body holding device, embodied in the present invention, for explaining the first embodiment and the manufacturing method of the fixing roller (the first roller), using a shaping mold.

FIG. 3 shows an illustrative view of a roller body holding device, embodied in the present invention, for explaining the first embodiment and the manufacturing method of the fixing roller (the first roller), using a shaping mold.

In FIG. 3, since the left side structure is substantially same as the right side structure, except an injection hole, to be described later, of a molding material, only the right side structure is indicated.

In FIG. 3, numeral 307 indicates the roller body, while numeral 308 indicates the heat-rays absorbing layer, though it is already molded in the shaping mold.

Numeral 400 indicates flanges, serving as a roller body holding member (holding device), having a function of holding roller body 307 of cylindrical shape to position roller body 307 at a predetermined position in the shaping mold, to be described later.

Flanges 400 are respectively inserted (press-fitted) into roller body 307 from each of its end openings, and each of flanges 400 has a plurality of ring-shaped grooves 403, which are formed on its outer circumferential surface with appropriate gaps.

Numeral 405 indicates a ring-shaped elastic member (an O-type ring) made of silicon rubber or fluorine rubber. A part of elastic member 405 is fitted into each of grooves 403 and another part of elastic member 405 is protruded from the outer circumferential surface of flanges 400, so as to contact the inner circumferential surface of roller body 307 with an appropriate pressure, resulting in an integration of flanges 400 with roller body 307.

Elastic member 405 is detachable with respect to grooves 403.

Numeral 407 indicates an end portion, opposing to roller body 307. When the integration of flanges 400 with roller body 307 is completed, end portion 407 engages the end of roller body 307 with putting elastic member 408 between them.

Numeral 420 indicates a through-hole provided at the outer end portion of flanges 400. A separating member (not shown in the drawings) is inserted into through-hole 420 to separate flanges 400 from roller body 307 after the completion of the molding.

Symbol J indicates a shaft for integrating flanges 400, each of which is equipped at each end of roller body 307.

Numeral 407 indicates spacing members arranged on shaft J with appropriate gaps between them.

Numeral 500 indicates a shaping mold, having a uniform inner diameter in its longitudinal direction, for molding the heat-rays absorbing layer, while numeral 550 indicates a supporting member, equipped at the side of molding apparatus, for positioning roller body 307 at a predetermined position by supporting the protruded portion of flanges 400.

Numeral 570 indicates an injection hole for injecting the molding material (layer forming material) into the mold.

The manufacturing process of first fixing roller 305, namely, the molding process for forming a rubber layer on the outer circumferential surface of roller body 307, will be detailed in the following.

Initially, flanges 400 are press-fitted into the both end openings of roller body 307 and integrated into one structural body with roller body 307 by means of shaft J. Then, the integrated structural body is inserted into shaping mold 500, and roller body 307 is positioned at predetermined position in the shaping mold by engaging the protruded end portion of flanges 400 into the concave portion of supporting member 550.

When integrating roller body 307 with flanges 400, elastic member 405 compensates the allowance between them, and shaft J prevents the center axes of them from inclining each other, resulting in a concentricity of the inner circumferential surface of roller body 307 with the outer circumferential surfaces of flanges 400.

Further, when inserting such the integrated structural body into shaping mold 500, the inner circumferential surface of shaping mold 500 also becomes concentric with the outer circumferential surface of roller body 307.

In the next step, a liquid material for forming the layer is injected from injection hole 570 with a predetermined pressure.

When an appropriate detector detects the fulfillment of packing the liquid material for forming the layer (a rubber material) into a gap formed between the inner circumferential surface of shaping mold 500 and the outer circumferential surface of roller body 307, the injecting operation is stopped, and the solidification process of the liquid material in the thermal-curing action is urged.

After the solidification process is completed, roller body 307 is extracted from shaping mold 500. Thus, the rubber layer, having a uniform outer diameter with respect to the center axis of the roller body, can be formed on the outer circumferential surface of the first fixing roller.

Further, a bar-shaped separating member is inserted into through-hole 420 to separate flanges 400 form roller body 307. Then, the fixing roller can be obtained.

Accordingly, since first fixing roller 305, manufactured in the abovementioned process, can be supported by the bearings disposed on the supporting frame of the fixing device, it becomes possible to easily incorporate first fixing roller 305 into the fixing device.

Further, in the above case, it becomes possible to stabilize the pressure-contacting state between first fixing roller 305 and second fixing roller 315, by inserting the bearings onto the rubber layer formed on first fixing roller 305 at both end portions of it.

Incidentally, instead of employing bearings, it is also possible to support first fixing-roller 305 with two rotatable pressing rollers disposed at two points on first fixing roller 305 other than the contacting point with second fixing roller 315, so as to support first fixing roller 305 at three points including the contacting point with second fixing roller 315.

Figure 4:
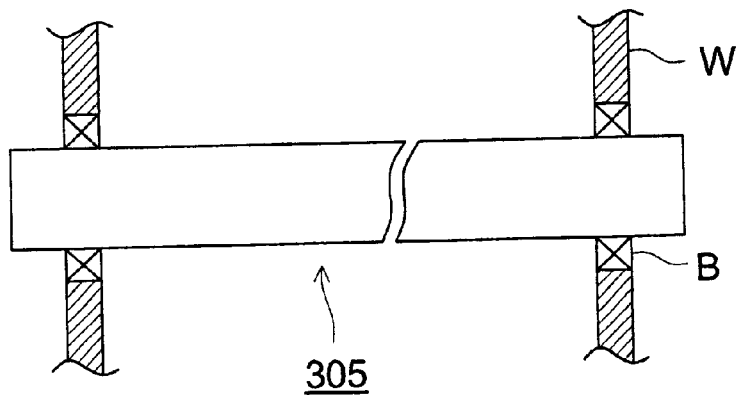
FIG. 4 shows a partial illustrative view of the first fixing roller supported by bearings.

FIG. 4 shows a partial illustrative view of first fixing roller 305 supported by bearings.

In FIG. 4, symbol W indicates a supporting frame, and symbol B indicates bearings attached to supporting frame W.

Incidentally, in the configuration mentioned above, the length of flanges 400 press-fitted into roller body 307, the number of grooves 403, the spacing length between grooves, etc. can be determined at suitable values as needed. Although a commercially available O-ring can be employed for elastic member 405 and is easy to detach, elastic member 405 is not limited to the O-ring, but either belt-shaped one having a rectangular cross section, other-shaped one or non-ring shaped one could be employed for elastic member 405.

Further, the width of the groove does not necessary coincide with its depth or the thickness of elastic member 405.

The essential point is that the operation of press-fitting the flanges into roller body 307 can be easily performed and the stable integrating operation can be performed.

Figure 5:
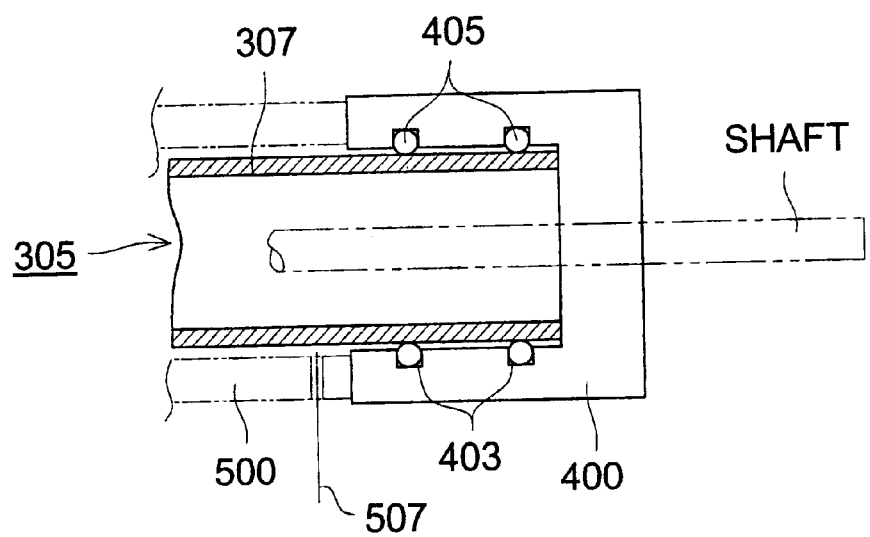
FIG. 5 shows a partial illustrative view of the second embodiment of the roller body holding device.

FIG. 5 shows a partial illustrative view of the second embodiment of the roller body holding device.

The second embodiment is different from the first embodiment of the roller body holding device in such a point that the outer circumferential surface of the end portion of roller body 307 is inserted into flanges 400 with putting elastic member 405 between them to integrate them into one structural body.

Incidentally, the left side structure of the flange and the roller body is substantially same as the right side structure shown in FIG. 5, except an injection hole of the fluid material for forming the layer, though it is not shown in FIG. 5.

In FIG. 5, the same members as the aforementioned members are indicated with the same notational symbols. In addition, since the molding step of forming the rubber layer on the outer circumferential surface of roller body 307 is the same as that in the first embodiment, the explanation is omitted.

As for the length of flanges 400 press-fitted into roller body 307, the number, the depth and the width of grooves 403, the shape of the elastic member, etc. in the second embodiment, the explanation described in the first embodiment can be cited for the second embodiment, as well.

Incidentally, although the roller body, employed in the abovementioned embodiments, is the cylindrical element made of the transparent material such as a glass or a resin material, needless to say that the roller body holding device, embodied in the present invention, can be applied for a roller body made of another material, for instance, a metallic material, etc.

Further, in the abovementioned embodiments, it is possible to provide a PFA tube on the inner circumferential surface of the shaping mold in advance. Then, after inserting the roller body into the PFA tube provided in the shaping mold, the liquid material for forming the layer is injected into the gap between the roller body and the PFA tube and solidified by the thermal-curing action. Thus, it becomes possible to form the fixing roller, integrated with the rubber layer and the PFA tube coated on the rubber layer, at a time.

According to the roller body holding device, embodied in the present invention, it becomes possible to hold the roller body integrated with the roller body holding device having a very simple structure and to form a high-accurate rubber layer on the outer circumferential surface of the roller body.

Figure 6:
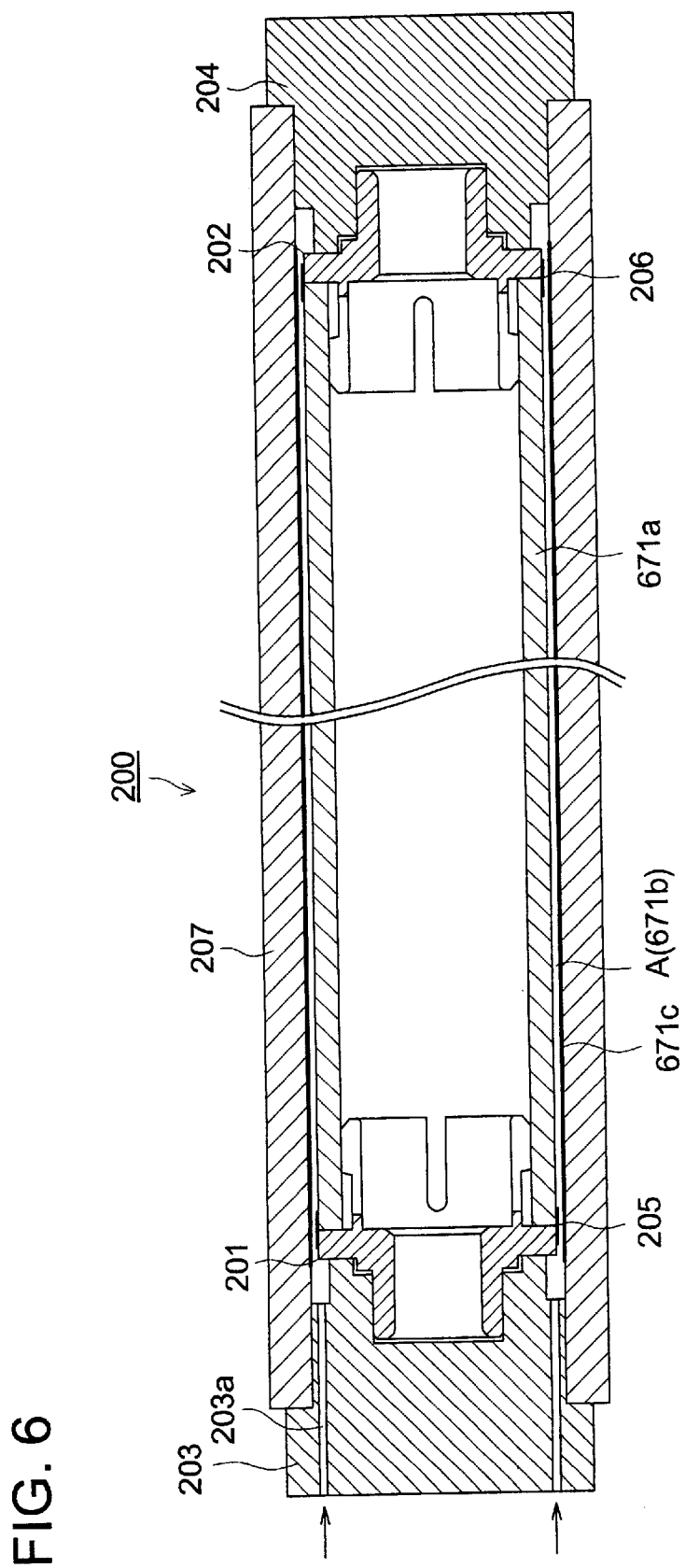
FIG. 6 shows a cross sectional view of a shaping mold for manufacturing the fixing roller.
Figure 7:
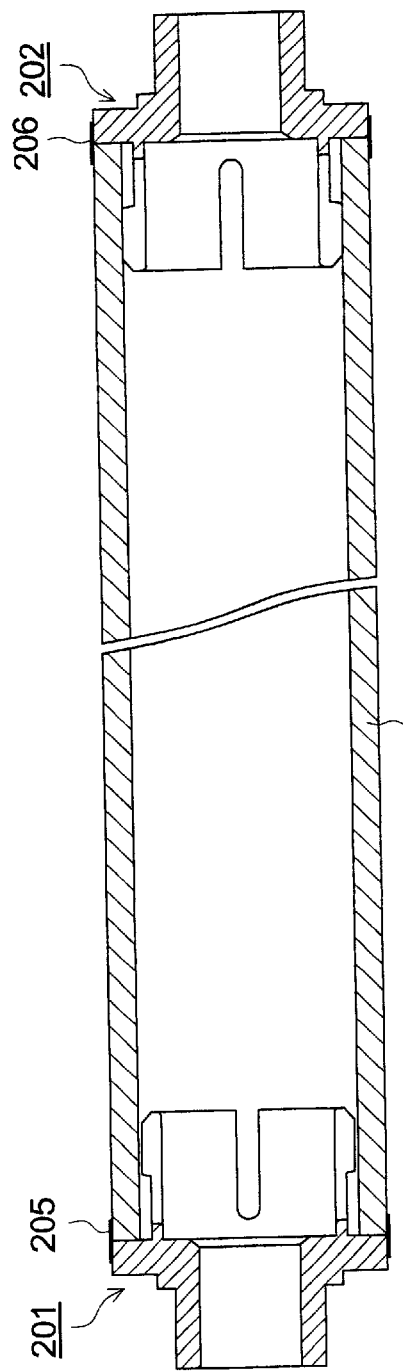
Figure 7:
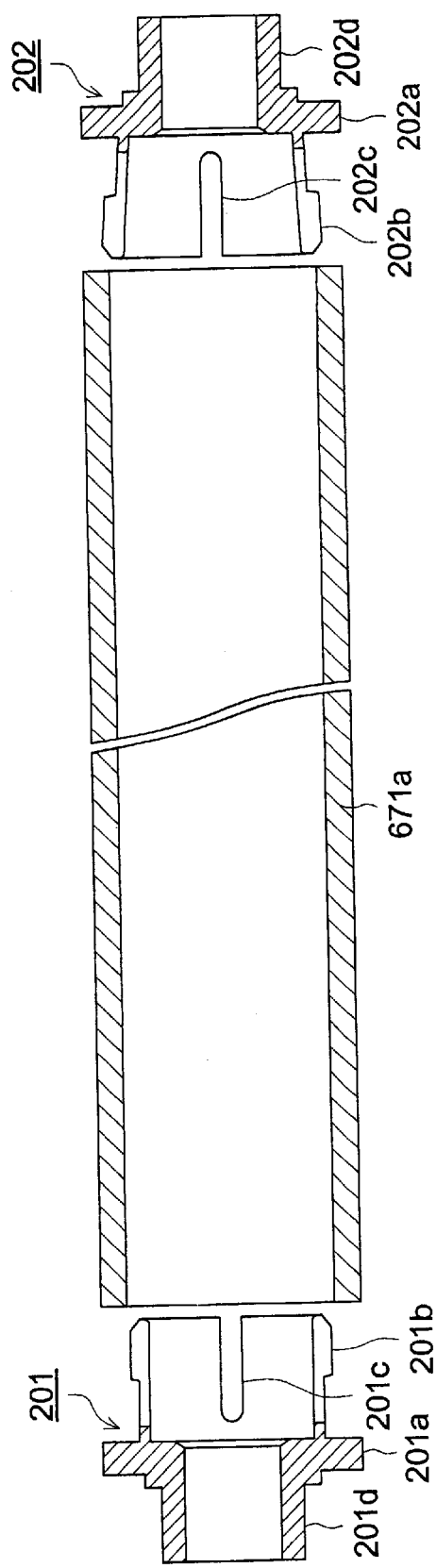
Figure 8:
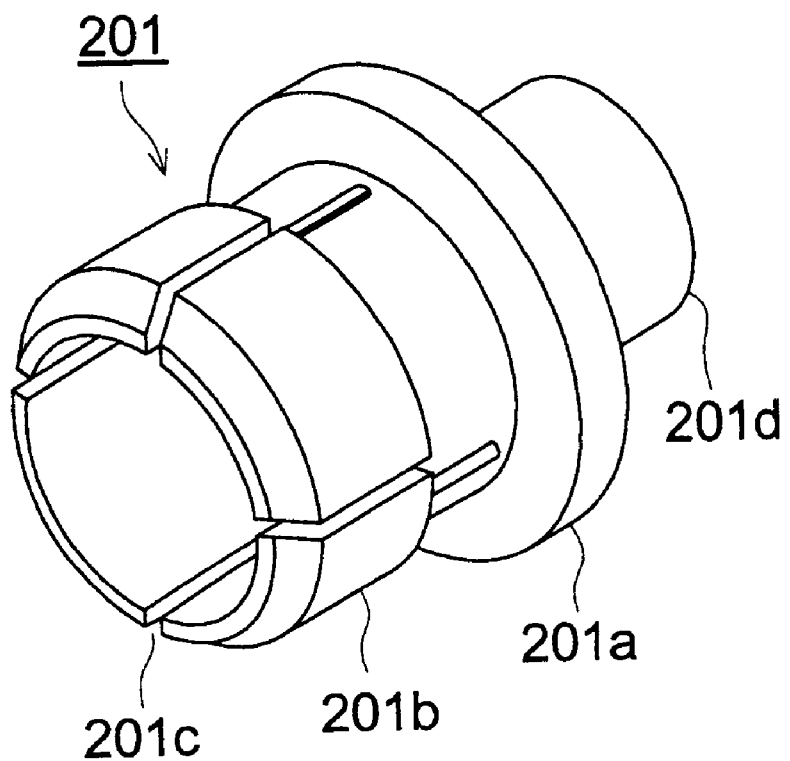
FIG. 8 shows perspective view of the holding member.

FIG. 6 shows a cross sectional view of shaping mold 200 for manufacturing fixing roller 671, as a third embodiment of the roller body holding device embodied in the present invention. FIG. 7(a) shows a cross sectional view of transmittable base body 671a, both end portions of which are supported by holding members 201, 202 fitted at left and right respectively. FIG. 7(b) shows a cross sectional view of transmittable base body 671a, illustrating a state before holding members 201, 202 are fitted into both end portions of transmittable base body 671a. FIG. 8 shows perspective view of holding member 201.

Shaping mold 200 is comprised of holding members 201, 202, fixed mold 203, movable mold 204 and sleeve mold 207.

Holding member 201 includes flange section 201a, which contacts the end of transmittable base body 671a; holding portion 201b, having a spring property and linked to flange section 201a to hold transmittable base body 671a by elastically pressing its inner circumferential surface; a plurality of slits 201c, which allow the outer diameter of holding portion 201b to be deformed elastically; and support section 201d.

Holding member 202, which is the same shape as that of holding member 201, includes flange section 202a, holding portion 202b, a plurality of slits 202c, and support section 202d. Support section 201d is supported by inserting it into fixed mold 203.

Next, the manufacturing process of fixing roller 671 will be detailed as follows:

(1) Connecting Fixed mold 203 to an injection apparatus (not shown in the drawings);

(2) Supporting both end portions of transmittable base body 671a by holding members 201, 202 respectively fitted at left and right (refer to FIG. 7(a)), and temporarily fixing the joint portion between both end portions of transmittable base body 671a and holding members 201, 202 by means of fixing tapes 205, 206;

(3) Connecting support section 201d of holding members 201 to fixed mold 203, while holding transmittable base body 671a and holding members 201, 202, which are temporarily fixed each other;

(4) Connecting sleeve mold 207, on the inner circumferential surface of which heat-rays absorptive layer 671c is temporarily fixed, to fixed mold 203;

(5) Inserting movable mold 204 into sleeve mold 207 and closing the mold after fitting movable mold 204 in support section 202d of holding member 202;

(6) The silicon rubber, jetted from the injection apparatus to injection hole 203a, is injected into gap A formed between the inner circumferential surface of sleeve mold 207 and the outer circumferential surface of transmittable base body 671a to form elastic layer 671b and heat-rays absorptive layer 671c on the outer circumferential surface of transmittable base body 671a;

(7) Disassembling shaping mold 200 in the reverse order of the abovementioned assembling process, after the completion of the molding process by means of shaping mold 200, to take put fixing roller 671 comprised of elastic layer 671b and heat-rays absorptive layer 671c, which are formed on the outer circumferential surface of transmittable base body 671a; and (8) Cutting off the residual portions of elastic layer 671b and heat-rays absorptive layer 671c at the both end portions of fixing roller 671 to finish fixing roller 671.

Figure 9:
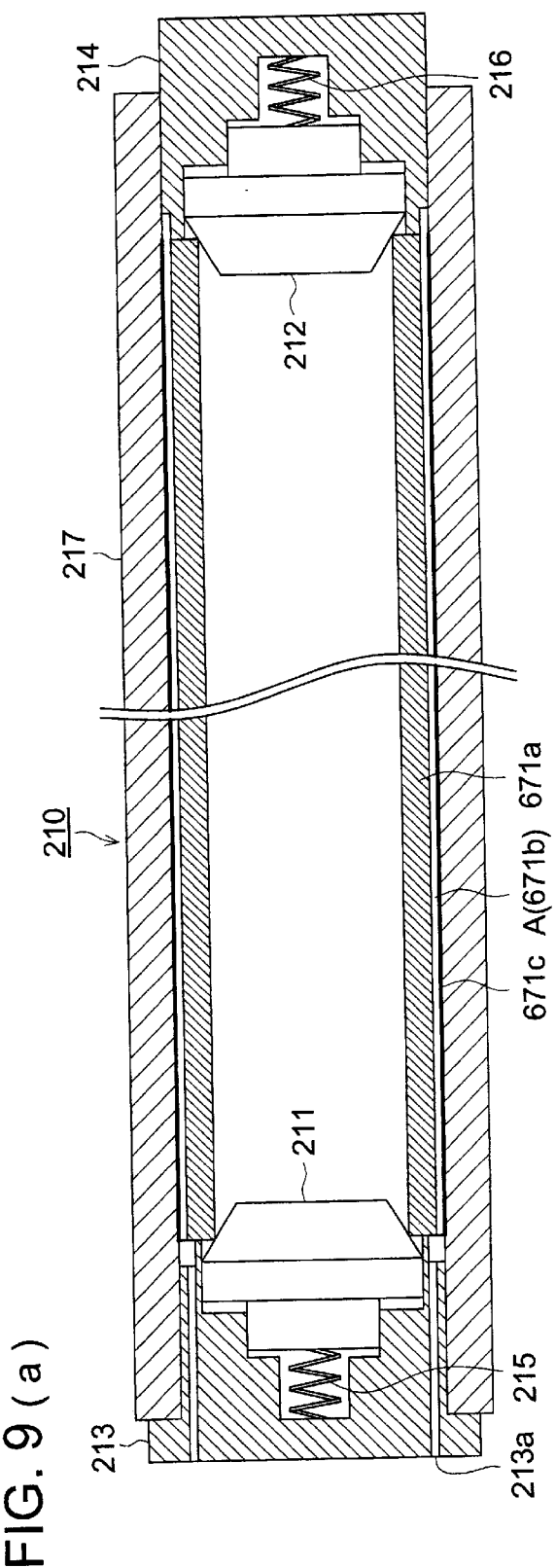
Figure 9:
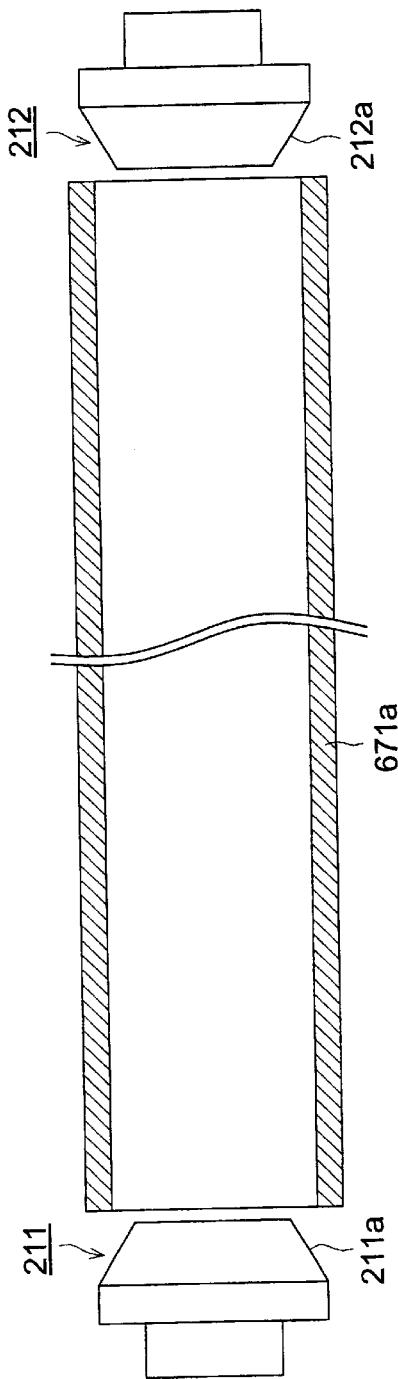

FIG. 9(a) shows a cross-sectional view of fixing roller 671 and shaping mold 210 for manufacturing fixing roller 671, as a forth embodiment of the roller body holding device embodied in the present invention. FIG. 9(b) shows a cross sectional view of transmittable base body 671a, illustrating a state before holding members 201, 202 are attached to both end portions of transmittable base body 671a. Incidentally, the explanation for the same functions as those of the third embodiment will be omitted, and only the different points will be detailed in the following.

Shaping mold 210 is comprised of holding members 211, 212, fixed mold 213, movable mold 214, springs 215, 216 and sleeve mold 217.

Each of cone-shaped surfaces 211a, 212a of holding members 211, 212 respectively contacts each of both end edges of the inner circumferential surface of transmittable base body 671a to support transmittable base body 671a.

Holding member 211 is movably accommodated in the concave portion of fixed mold 213 and urged by spring 215. Cone-shaped surface 211a of holding members 211 pushes the end edge of the inner circumferential surface of transmittable base body 671a to position transmittable base body 671a. In the same manner as the above, holding member 212 is also movably accommodated in the concave portion of fixed mold 214 and urged by spring 216. Cone-shaped surface 212a of holding member 212 pushes the other end edge of the inner circumferential surface of transmittable base body 671a, so that the center axis of transmittable base body 671a precisely coincides with the center axis of holding members 211, 212.

Holding members 211, 212 support transmittable base body 671a. Fixed mold 213 and movable mold 214 are mounted into sleeve mold 217, and then, after closing the mold, the silicon rubber is injected into gap A formed between the inner circumferential surface of sleeve mold 217 and the outer circumferential surface of transmittable base body 671a from injection nozzle 213a, so as to form elastic layer 671b and heat-rays absorptive layer 671c on the outer circumferential surface of transmittable base body 671a.

Since the both end potions of transmittable base body 671a are elastically supported by holding members 211, 212, which are elastically urged by spring 215, 216, displacement of transmittable base body 671a, caused by the thermal expansion of it during the molding operation by means of shaping mold 210, can be absorbed by the movements of holding members 211, 212 in the axis direction. Thus, it becomes possible to prevent transmittable base body 671a from the destruction during the molding operation.

Incidentally, it is also applicable that holding members 211, 212 are formed in a bevel gear shape or a triangle drill shape, so as to partially contact both end potions of inner circumferential surface of transmittable base body 671a.

According to shaping molds 200, 210, embodied in the present invention, the covering operation of the elastic layer can be performed in a high yield rate, without destroying transmittable base body 671a.

Disclosed embodiment can be varied by a skilled person without departing from the spirit and scope of the invention.

What is claimed is:

1. A method for manufacturing a fixing roller, comprising steps of:

press-fitting flanges into a roller body, shaped in a hollow cylinder, from each of both end openings of said roller body with putting elastic members between each of said flanges and either an inner or an outer circumferential surface of said roller body;

installing said roller body integrated with said flanges in a shaping mold, in such a manner that said elastic members press-contact either said inner or said outer circumferential surface of said roller body so as to substantially align a center axis of said roller body with that of said shaping mold, wherein said roller body is supported only by said elastic-members;

injecting a melted rubber into a space between said roller body and said shaping mold from an injection opening; and curing said melted rubber injected into said space.

2. The method of claim 1,
wherein said roller body is made of glass, and said melted rubber contains a heat absorbing material.

3. The method of claim 1,
wherein a heat-resistant tube is provided on an inner circumferential surface of said shaping mold, and integrated with said roller body by curing said melted rubber.

4. The method of claim 1,
wherein said elastic members are provided on either inner or outer circumferential surfaces of said flanges, so as to shape a ring.

5. The method of claim 1,
wherein said flanges are fitted into a shaft, which is inserted into an interior of said roller body.

6. The method of claim 1,
wherein said elastic members are shaped in a ring, and equipped in a groove, which is formed in a circumferential direction on either inner or outer circumferential surfaces of said flanges.

7. The method of claim 1,
wherein said elastic members are equipped on either inner or outer circumferential surfaces of said flanges, spaced apart at appropriate distances.

8. The method of claim 1,
wherein said elastic members are detachable with respect to said flanges.

9. The method of claim 1,
where said elastic members are made of either a silicon rubber or a fluorine rubber.

10. The method of claim 1,
wherein said roller body, shaped in said hollow cylinder, is made of glass.

* * * * *